Jan. 9, 1934. S. M. WECKSTEIN 1,943,049
BEARING CONSTRUCTION
Filed Oct. 22, 1932 3 Sheets-Sheet 1
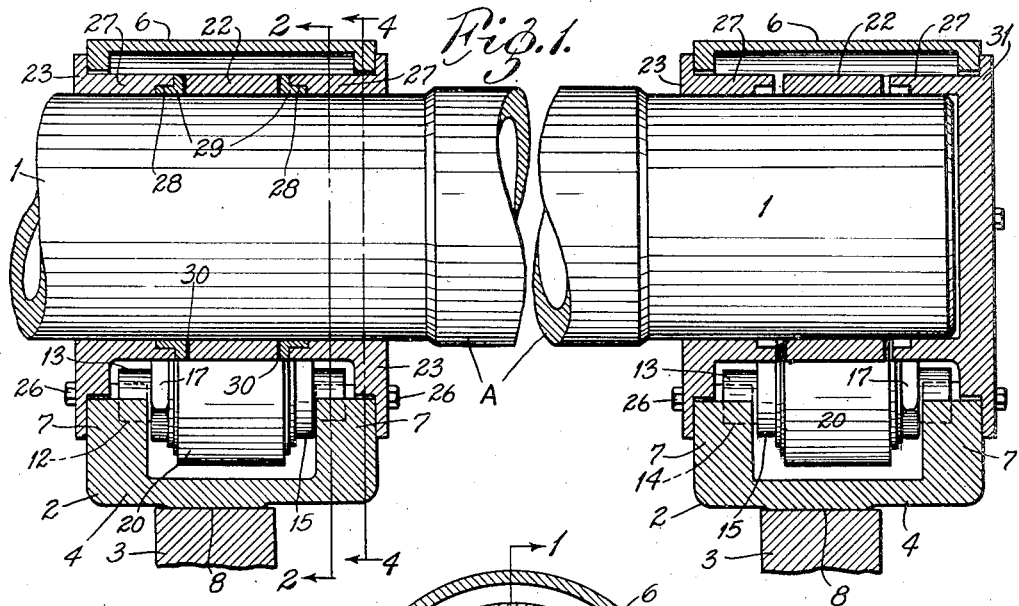
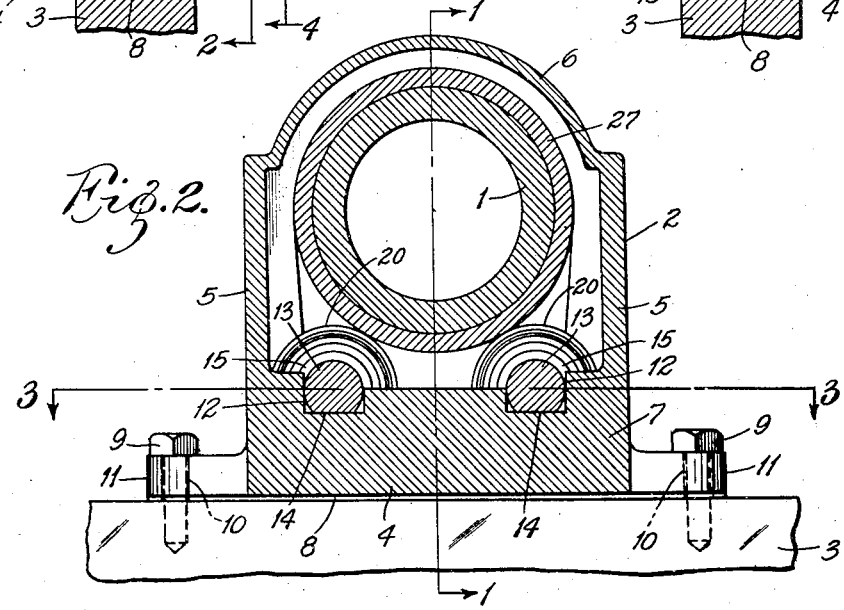
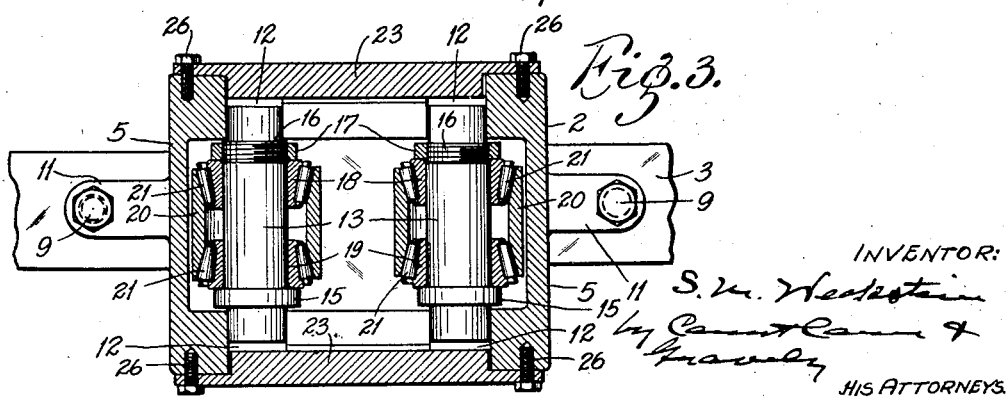
INVENTOR:
S. M. Weckstein
HIS ATTORNEYS.

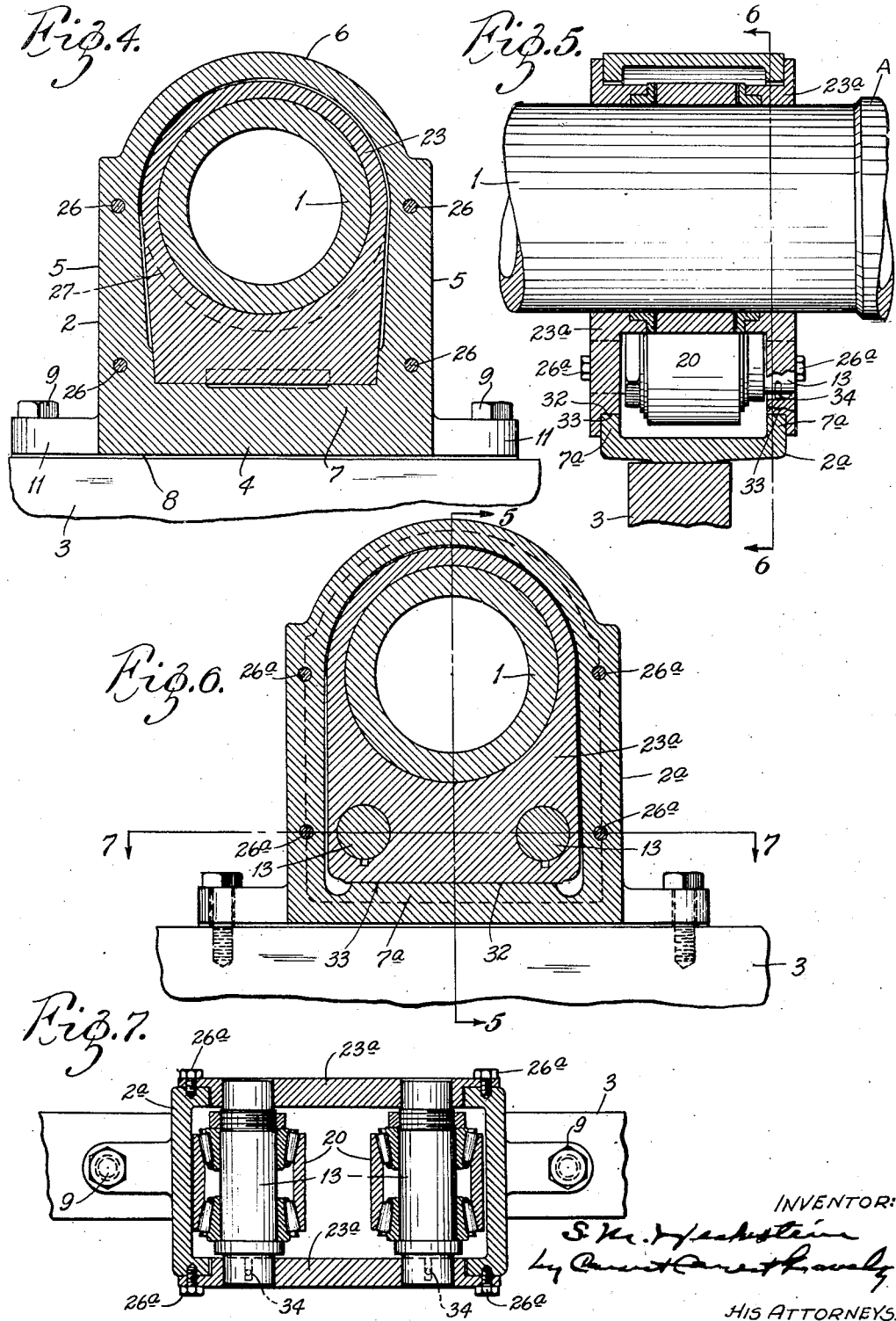

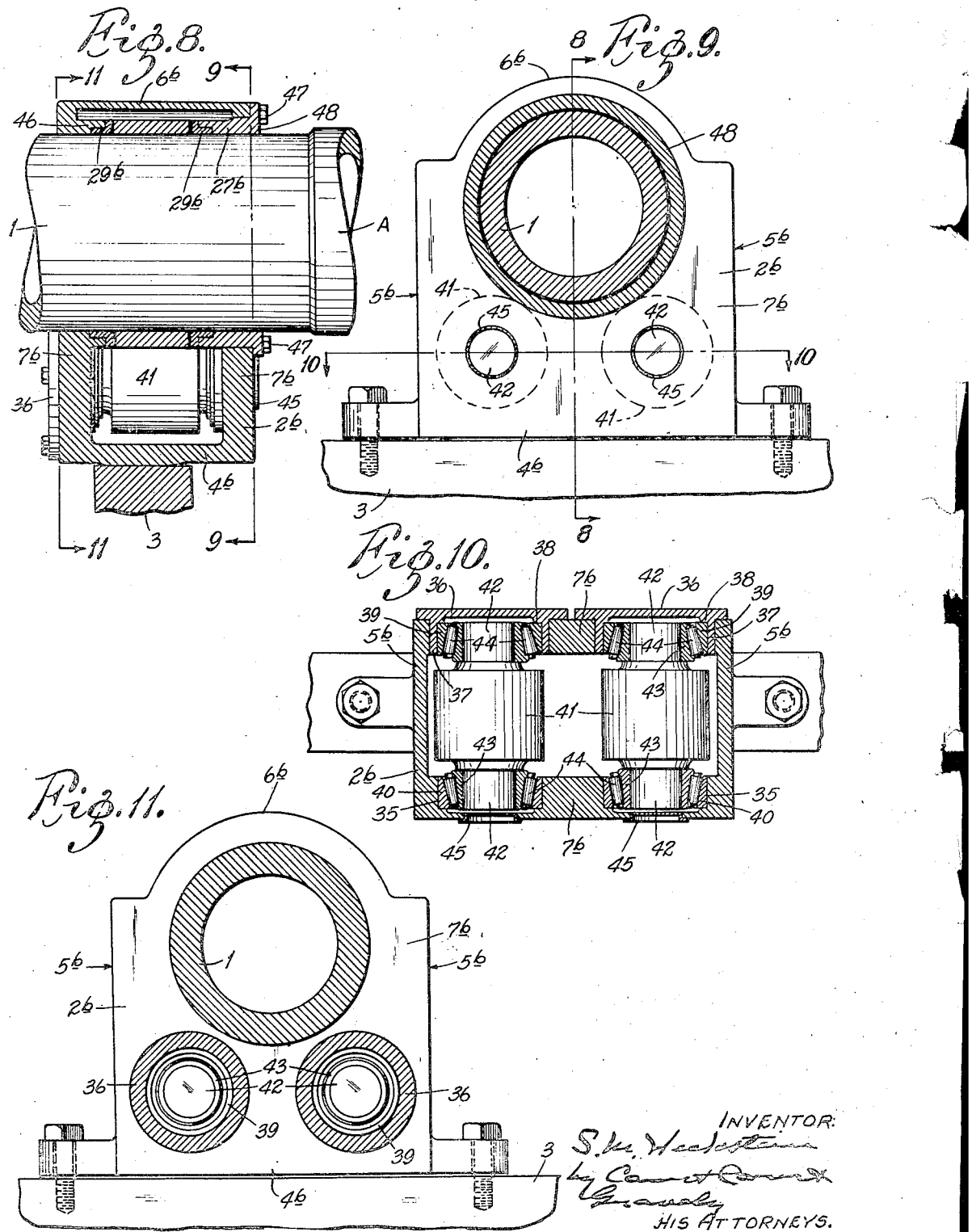

Patented Jan. 9, 1934

1,943,049

UNITED STATES PATENT OFFICE 1,943,049

BEARING CONSTRUCTION

Samson M. Weckstein, Canton, Ohio, assignor to The Timken Roller Bearing Company, Canton, Ohio, a corporation of Ohio Application October 22, 1932. Serial No. 639,075

10 Claims. (Cl. 308—203)

My invention relates to bearing constructions for comparatively large rolls which are subjected to excessive heat, such as paper dryer rolls. In the paper industry, the paper material is dried by running it over a long train of rolls which are arranged in staggered relation with respect to each other and which are hollowed out so that heat may be introduced into them for drying purposes. Obviously, it is desirable to make dryer rolls as large as possible and to crowd them as close together as practicable so that a maximum amount of surface contact between the paper material and the rolls is obtained. Moreover, it is necessary that the dryer rolls rotate freely to prevent injury to the paper material traveling around them; and in equipping dryer rolls with antifriction bearings to insure free rotation thereof, extremely difficult problems arise since the space for the bearings is limited and since the rolls are continuously subjected to a high degree of heat.

Paper dryer rolls have been heretofore equipped with antifriction bearings comprising a series of antifriction members, such as rollers, or the like, surrounding the dryer roll necks. With this arrangement, the size of the bearing is, obviously governed by the size of the roll neck; and as the dryer roll necks are made comparatively large, the size of the bearings are much larger than that actually required to withstand the load imposed upon them. Since the bearings are mounted directly on the roll necks, they are subjected to the high degree heat introduced into the rolls. Accordingly, the bearings must be designed to withstand comparatively high temperatures and provided with comparatively expensive circulating oil systems. For these reasons, the usual type of bearings for paper dryer rolls is quite expensive and difficult to maintain.

The principal objects of the present invention are to provide bearings for comparatively large rolls, such as paper dryer rolls, which will take up considerably less room than the usual type of such bearings; which will not be subjected to the high degree of heat introduced into the rolls; which will readily allow for roll expansion; and which can be economically lubricated. A further object is to provide a roll bearing construction which is readily assembled and dismantled.

The invention consists principally in a frame having journal housings rockably mounted thereon which support trunnion rolls; and a work roll having its neck provided with wear rings which rest on said trunnion rolls for supporting said work roll, and means provided on the journal housing at one end only of said work roll for engaging the ends of the roll neck wear ring so that one end of the roll is substantially fixed whereas the opposite end thereof is free to float. The invention also consists in the bearing construction and in the parts, combinations and arrangements of parts, hereinafter described and claimed.

In the accompanying drawings which form part of this specification and wherein like reference symbols refer to like parts wherever they occur, Fig. 1 is a vertical sectional view through a paper dryer roll mounted on a dryer mill frame in accordance with my invention, and it is a view along the line 1—1 in Fig. 2, Fig. 2 is a vertical sectional view along the line 2—2 in Fig. 1, Fig. 3 is a horizontal sectional view along the line 3—3 in Fig. 2, Fig. 4 is a vertical sectional view of the roll journal housing along the line 4—4 in Fig. 1, Fig. 5 is a view similar to the left hand side of Fig. 1, illustrating a modified form of my invention, and it is a view along the line 5—5 in Fig. 6, Fig. 6 is a vertical sectional view along the line 6—6 in Fig. 5, Fig. 7 is a view along the line 7—7 in Fig. 6, Fig. 8 is a view similar to Fig. 5 illustrating another modified form of my invention, and it is a view along the line 8—8 in Fig. 9, Fig. 9 is a vertical sectional view along the line 9—9 in Fig. 8, Fig. 10 is a horizontal sectional view along the line 10—10 in Fig. 9, and Fig. 11 is a sectional view along the line 11—11 in Fig. 8.

In Figs. 1 to 4, inclusive, a hollow dryer roll A has its neck portions 1 extending into journal boxes 2 which are rockably mounted on the tops of upright side members 3 of a paper dryer mill frame; and only the upper end portions of the side members 3 of the paper dryer mill frame are shown in the drawings as the frame may be of any suitable construction. Each journal box is of integral construction and comprises a rectangular base portion 4, side walls 5 merging into a rounded top wall 6, and end walls 7 which extend only a short distance upwardly from the base portion of the box; and the roll neck extends through the box above the tops of these lower end walls. The central part of the bottom surface of the journal box extending parallel to the side walls 5 thereof is rounded as at 8 so that the journal box can rock on the side member of the mill frame. The journal box is held in place on the side frame member by bolts 9 extending through holes 10 in lugs 11 extending from the sides of the base portion of the box, the holes 10 being of larger diameter than the bolts 9 to allow rocking movement of the box.

The end walls 7 of the journal box have rectangular notches 12 located opposite each other in their upper ends, and two spaced pins 13, extending parallel to the roll neck, are mounted in the journal box with their ends extending into said notches 12; and the ends of the pins have flat surface portions 14 which rest on the bottoms of the notches. The pins 13 have annular ribs 15 adjacent to the inner end wall of the journal box, and the ends of the pins next to the outer end wall of the box are provided with threaded portions 16 having threaded adjusting rings 17 assembled thereon. Mounted on each pin 13 is a bearing cone 18 having its larger end abutting against the adjusting ring 17, and a cone 19 is mounted on each pin with its larger end abutting against the rib 15. Mounted around each pin is a comparatively large bearing cup 20 provided with raceways for cooperating with those of the cones 18 and 19 on the pin, and rollers 21 are interposed between the cup and cones. The roll neck 1 is provided with a shrunk-on cylindrical wear ring 22 which rests on the outer periphery of the cups mounted around the pins so that the cups and pin bearing assemblies constitute trunnion rolls for supporting the paper dryer roll. The journal box at the left hand side of Fig. 1 is provided with end closure rings 23 which are secured to the journal box by bolts 26 extending through the rings and into holes provided therefor in the ends of the side walls of the journal box. Each closure ring has an annular flange 27 which surrounds the roll neck and which extends toward the wear ring thereon. The end of each flange 27 is provided with an annular recess 28 adjacent to the roll neck; and an L-shaped bushing ring 29, with its flat end facing the wear ring, is interposed between the flanges and the wear ring, a slight clearance space 30 being provided between the end of the wear ring and the end of the bushing ring.

The journal box and trunnion roll construction at the other end of the dryer roll A, (the end shown at the right hand side if Fig. 1), is similar to that of the end just described. However, at this end of the roll, the roll neck, preferably, does not extend entirely through the journal box, and a cover plate 31 is secured to the outer end of the journal box for closing the same. This cover plate 31 has an annular flange similar to the one extending from the inner closure ring, but at this end of the roll, bushing rings are not interposed between the ends of such flanges and the ends of the wear ring which leaves a considerable clearance space at each end of the wear ring so that the roll neck is free to move endwise.

In the modified form of my invention shown in Figs. 5 to 7, inclusive, the journal boxes 2a which are mounted on the side frame members are of substantially the same shape as those of the preferred form, with the exception that the end walls 7a extend only a very slight distance upwardly from the base portions of the boxes, and the tops of these walls are made flat and constitute seats 32 for the closure rings 23a which have flat bottoms 33 for engaging such seats 32, and the closure rings 23a are held in place on the journal box by bolts 26a. The trunnion rolls which are located in the lower portion of the journal box for supporting the roll neck have their end portions extending into cylindrical openings in the cover plates, and key members 34 are placed in longitudinal slots in the ends of the central trunnion roll pins and in registering slots in the wall of the openings through the inner closure rings. The trunnion rolls are otherwise of similar construction to that of the preferred form; and it is to be understood that in this form of my invention, the wear bushings which are interposed between the flanges of the cover plates and the wear ring are used at one side only of the dryer roll so that one end thereof is substantially fixed and the other end is free to float.

In the modified form of my invention illustrated in Figs. 8 to 11, inclusive, the journal box 2b comprises a rectangular base portion 4b, side walls 5b, a rounded top wall 6b supported thereby, and end walls 7b which extend the full height of the box. The outer end wall is provided with an enlarged opening through which the roll neck extends, and which opening is of substantially the same diameter as the roll neck, whereas the inner end wall adjacent to the roll body has an opening therethrough for the roll neck which is of greater diameter than that of the roll neck; and the outer end wall also has a pair of spaced openings located below the roll neck, whereas the inner end wall has annular recesses 35 located opposite the openings through the outer end wall. Bolted to the outer end wall are plate members 36 which close the openings through the wall, and each of these members have an inwardly extending annular flange 37 which engages the wall of the opening, said flange being provided with an annular seat 38 for receiving a bearing cup 39. A bearing cup 40 is mounted in each of the annular recesses 35 in the end wall of the box adjacent to the roll body; and disposed within the journal box are small solid trunnion rolls 41 for supporting the roll neck. These rolls 41 have reduced end portions 42 having cones 43 mounted thereon for cooperating with the cups; and rollers 44 are interposed between the cones and cups. For reasons hereinafter set out, the openings through the outer wall which receive the cup carrier members 36 have a larger diameter than that of the body portion of the solid trunnion rolls.

Preferably, the inner end wall of the box has small holes extending therethrough which open into the bottoms of the annular recesses and which are provided with removable caps 45 so that the bearings supporting the inner ends of the trunnion rolls may be readily inspected. The outer end wall also has an inwardly extending annular flange 46 surrounding the roll neck which carries a bushing ring 29b adapted to engage the outer end of the wear ring on the roll neck. Secured to the inner wall of the box by bolts 47 is a closure ring 48 surrounding the roll neck. This ring has an annular flange 27b extending inwardly toward the inner end of the wear ring, which flange carries a bushing ring 29b for engaging the inner end of the roll neck wear ring. In this form of my invention, it is also to be understood that the bearing construction at the other end of the roll is of substantially similar construction to the end just described with the exception that annular bushing rings are not used and the roll neck, preferably, does not extend through the outer end wall.

The bearing constructions hereinabove described are all readily assembled or dismantled. In the preferred form of my invention, the bearings are assembled by placing the inner closure ring and bushing ring on the roll neck. The cylindrical wear ring is shrunk on the roll neck.

after which the journal box with the trunnion rolls assembled therein, is slipped over the roll neck and the outer closure plate is assembled in place. After the parts have been assembled in this manner, the closure rings are bolted to the journal box, which operation brings all of the parts in correct operative position.

In the construction shown in Figs. 5 to 7, inclusive, the inner closure ring and bushing ring are placed over the roll neck and the cylindrical wear ring is shrunk on in place. The journal box is then slipped over the roll neck and bolted to the inner closure plate. The trunnion rolls are then assembled within the journal box making sure that the dowel pins in the trunnion roll shafts are properly engaged in the openings provided for them in the closure plates. The outer closure ring is then bolted to the housing which accurately positions all of the bearing parts.

The construction shown in Figs. 8 to 11, inclusive, is assembled by first placing the closure ring and inner bushing ring on the roll neck, then shrinking the cylindrical wear ring in place, and then slipping the journal box over the roll neck. The solid trunnion rolls with the cones and rollers assembled thereon are then slipped through the openings in the outer wall of the journal box, and then the cup carrier members with the cups mounted therein are fitted in place and bolted to the housing. Obviously, the cup carriers tend to bring the bearing parts into proper adjustment, and, if necessary, shims may be interposed between the cup carrier members and the wall of the journal box to provide for adjustment of the bearings.

With my invention, the size of the bearings is dependent upon the load as contrasted with the usual type of paper roll bearing wherein the controlling factor regulating the size of the bearings is the size of the roll necks. Accordingly, paper dryer roll bearings, embodying my invention, can be made at much less cost than the usual type of bearings which are mounted directly on the roll necks. Moreover, paper dryer rolls are subjected to a high degree of heat, and when the bearings are mounted directly on the roll necks, the heat which is introduced into the rolls is conducted to the bearings so that they must be designed to withstand a high degree heat. With my bearing arrangement, the trunnion roll bearings are spaced a considerable distance away from the roll necks and, accordingly, they are not subjected to the full degree of heat of the rolls and there is practically no chance of the bearings being injured or affected by the heat of the dryer rolls.

Obviously, paper dryer rolls must be designed so as to allow for roll expansion caused by the heat introduced into the rolls. With my construction, the rolls merely rest on the trunnion rolls and are free to move laterally. However, with my novel wear ring arrangement, together with the roll housings and closure rings, the bushing rings on the one end of the roll correctly position and prevent the roll from moving laterally; but, as the opposite end of the roll is free to move laterally, this arrangement readily accommodates roll expansion without allowing the roll to get out of alinement or cramp its bearings. Also, since the roll housings are rockably mounted on the mill frame, the rolls are free to tilt endwise which eliminates all possibility of buckling or cramping the rolls and also makes the rolls easy to install and self-adjusting in case the mill frame is not accurately made.

With my bearing construction, the bearings are readily lubricated since the lower portions of the journal boxes form a reservoir from which it is impossible for the lubricant to escape; and any lubricant, which may be splashed around the walls of the box by the trunnion rolls, cannot escape from the box as it is completely enclosed.

Furthermore, the journal boxes are not split on their horizontal center lines, and they can be manufactured at a comparatively low cost. The boxes can also be readily assembled on, or disassembled from the journals in a comparatively shorter time, so that it is an extremely simple matter to replace the bearings or the trunnion rolls.

Obviously, the constructions hereinabove described admit of considerable variations without departing from the spirit of my invention. Accordingly, I do not wish to be limited to the precise constructions shown and described.

What I claim is:

1. The combination of a frame, journal boxes thereon, a pair of trunnion rolls in each box, a work roll having its neck portions extending into the boxes and provided with integral wear rings which rest on said trunnion rolls, and means provided on the box at one end only of said work roll for engaging the ends of the work roll neck wear ring whereby one end of said work roll is substantially fixed whereas the other end thereof is free to move endwise.

2. The combination of a frame, journal boxes rockably mounted thereon, a pair of trunnion rolls mounted in each box, a work roll having its neck portions extending into the boxes and provided with integral wear rings which rest on said trunnion rolls, and means provided on the box at one end only of said work roll for engaging both ends of the work roll neck wear ring at that end of the work roll whereby one end of said work roll is substantially fixed whereas the other end thereof is free to move endwise.

3. The combination of a frame, a journal box thereon, a trunnion roll in said box, a work roll having its neck portion extending into said box, a wear ring provided on said roll neck portion for engaging said trunnion roll, a closure ring secured to said box and having an annular flange surrounding the work roll neck portion and extending into said box, and a bushing ring interposed between said flange and said wear ring.

4. The combination of a frame, a journal box rockably mounted thereon, a pair of trunnion rolls in said box, a work roll having its neck portion extending into said box, said roll neck portion being provided with a wear ring for resting on said trunnion rolls, and a closure ring fixed to the wall of said box and having means extending into said box for engaging the end of said wear ring for preventing excessive endwise movement of said roll neck portion.

5. The combination of a frame, a journal box thereon, a pair of spaced trunnion rolls extending across said box and mounted on the end walls thereof, a work roll having its neck portion extending into said housing and provided with a wear ring which rests on said trunnion rolls, end closure rings fixed to said box and having annular flanges extending into said box and surrounding the roll neck, and a bushing ring interposed between the end of each annular flange and the adjacent end of said wear ring.

6. The combination of a frame, a journal box rockably mounted thereon, a pin member extending across said box and having its end portions resting in notches in the end walls of said box, an inner bearing member mounted near each end of said pin, a compartively large outer bearing member mounted around said pin, rollers interposed between said inner bearing members and said outer bearing member, a work roll having its neck portion extending into said housing, said neck portion being provided with a wear ring which engages the outer periphery of said outer bearing member, an end closure ring fixed to each end of said box and having an annular flange extending into said box and surrounding the roll neck, and a bushing ring interposed between the end of each flange and the wear ring with its ends adapted to abut against the end of said wear ring and the end of said flange.

7. The combination of a frame, a journal box thereon, an end closure ring fixed to each end of said box, a pair of trunnion rolls having their end portions mounted in the respective end closure rings, a work roll having its neck portion extending into said box, said neck portion being provided with a wear ring which rests on said trunnion rolls, each end closure ring having an annular flange extending into said box around said roll neck portion, and a bushing ring interposed between each flange and the adjacent end of the wear ring.

8. The combination of a frame, a journal box rockably mounted thereon, an end closure ring fixed to each end of said box, a pair of pin members extending across said box, each pin member having its end portions mounted in the respective end closure rings, an inner bearing member mounted around each end of each pin, an outer bearing member surrounding each pin, rollers interposed between said inner bearing members and said outer bearing members, a work roll having its neck portion extending into said box, said neck portion being provided with a wear ring which rests on the outer peripheries of said outer bearing members, each of said end closure rings having an annular flange extending into said box and surrounding the neck portion of said work roll, and a bushing ring interposed between the end of each flange and the adjacent end of the wear ring.

9. The combination of a frame, a journal box thereon having an opening through one wall and an annular recess in the opposite wall, a plate fixed on the outside of said box and having an annular flange extending into the opening in the wall of said box, an outer bearing member mounted in said annular flange, another outer bearing member mounted in the annular recess in the wall of the box, a trunnion roll in said box, an inner bearing member mounted on each end of said trunnion roll, rollers interposed between the inner bearing member at one end of said trunnion roll and the outer bearing member carried by the plate member, rollers interposed between the inner bearing member at the other end of said trunnion roll and the outer bearing member in the annular recess in the wall of the box, and a work roll extending into said box with its neck portion resting on the trunnion roll.

10. The combination of a frame, a journal box rockably mounted thereon, a trunnion roll in said box, a work roll having its neck portion extending through the upper portion of said box and provided with a wear ring which rests on said trunnion roll, a closure ring fixed to the inner end wall of said box and having an annular flange extending into the box and surrounding the roll neck portion, a bushing ring interposed between the end of said flange and the wear ring, and the outer wall of said box having an annular flange extending into the box and surrounding the roll neck, and a bushing ring interposed between the end of said flange and the wear ring.

SAMSON M. WECKSTEIN.